(12) United States Patent
Clarke et al.

(10) Patent No.: US 6,343,309 B1
(45) Date of Patent: Jan. 29, 2002

(54) METHOD AND APPARATUS FOR PARALLELIZING A GRAPHICS PIPELINE

(75) Inventors: Paul A. Clarke, Pflugerville; Brian Horton, Austin, both of TX (US)

(73) Assignee: International Business Machines Corporaton, Armonk, NY (US)

( * ) Notice: Subject to any disclaimer, the term of this patent is extended or adjusted under 35 U.S.C. 154(b) by 0 days.

(21) Appl. No.: 08/724,564

(22) Filed: Sep. 30, 1996

(51) Int. Cl.[7] .............................. G06F 9/50
(52) U.S. Cl. .................... 709/106; 345/418; 709/323
(58) Field of Search ................... 709/323, 104–106; 345/501–506, 418

(56) References Cited

U.S. PATENT DOCUMENTS

| | | | |
|---|---|---|---|
| 4,594,660 A | 6/1986 | Guenthner et al. | 364/200 |
| 5,050,066 A | 9/1991 | Myers et al. | 364/200 |
| 5,067,069 A | 11/1991 | Fite et al. | 395/394 |
| 5,287,508 A * | 2/1994 | Hejna, Jr. et al. | 709/102 |
| 5,307,478 A | 4/1994 | Rasbold et al. | 395/500 |
| 5,317,682 A | 5/1994 | Luken, Jr. | 395/442 |
| 5,325,485 A * | 6/1994 | Hochmuth et al. | 395/505 |
| 5,337,395 A | 8/1994 | Vassiliadis et al. | 395/27 |
| 5,345,541 A | 9/1994 | Kelley et al. | 395/426 |
| 5,353,418 A | 10/1994 | Nikhil et al. | 395/678 |
| 5,392,393 A | 2/1995 | Deering | 345/505 |
| 5,428,810 A | 6/1995 | Barkans et al. | 395/800.42 |
| 5,430,850 A | 7/1995 | Papadopoulos et al. | 395/683 |
| 5,430,851 A | 7/1995 | Hirata et al. | 395/388 |
| 5,440,682 A | 8/1995 | Deering | 345/503 |
| 5,490,255 A | 2/1996 | Rawlinson et al. | 395/395 |
| 5,499,349 A * | 3/1996 | Nikhil et al. | 712/26 |
| 5,517,603 A | 5/1996 | Kelley et al. | 395/426 |
| 5,530,815 A | 6/1996 | Nabekura et al. | 395/568 |
| 5,801,711 A * | 9/1998 | Koss et al. | 345/441 |

* cited by examiner

*Primary Examiner*—St. John Courtenay, III
*Assistant Examiner*—George Lawrence Opie
(74) *Attorney, Agent, or Firm*—Volel Emile; Bracewell & Patterson, L.L.P.

(57) ABSTRACT

A method and apparatus for processing hierarchical graphics data from an application. The data processing system includes a plurality of threads in which a first thread receives graphics data from the application. The data stream is partitioned into workgroups and a sequence number is associated with each workgroup identifying the order in which the workgroup should be processed. Each thread processes a unique portion of the workgroups. Processed workgroups are stored in a memory associated with the thread processing that workgroup. The primary thread dispatches the processed workgroups from each of the memories associated with the threads to a rasterizer for the graphics display device. The workgroups are dispatched in an order indicated by the sequence number associated with each processed workgroup.

14 Claims, 9 Drawing Sheets

METHOD AND APPARATUS FOR PARALLELIZING A GRAPHICS PIPELINE

BACKGROUND OF THE INVENTION

1. Technical Field

The present invention relates in general to an improved data processing system and in particular to an improved method and apparatus for graphical computation in a data processing system. Still more particularly, the present invention relates to a method and system of graphical computation to efficiently process graphics data in a data processing system.

2. Description of the Related Art

Data processing systems such as personal computers and workstations are commonly utilized to run computer-aided design ("CAD") applications, computer-aided manufacturing ("CAM") applications, and computer-aided engineering ("CAE") tools. Engineers, scientists, technicians, and others employ these applications daily. These applications involve complex calculations, such as finite element analysis, to model stress in structures. Other applications include chemical or molecular modelling applications. CAD/CAM/CAE applications are normally graphics intensive in terms of the information relayed to the user. Generally, users of these applications require and demand that the data processing systems be able to provide extremely fast graphics information.

The processing of graphics data to provide a graphical display on a video display terminal requires an extremely fast graphics processing system in order to provide a display with a rapid response. It is desirable to be able to provide the performance required utilizing the present technology.

Symmetric multiprocessor (SMP) data processing systems have been employed to improve and enhance overall system performance in response to the demand for rapid response and complex graphics displays. In general, overall system performance is improved by providing multiple processors to allow multiple applications, also called programs, to execute simultaneously on the same data processing system. Note, however, that in this situation, the application itself will execute with approximately the same performance. In other words, application performance is the same, but overall system performance may be improved. It is possible to increase performance of an application by changing it to utilize multiple processors simultaneously, but few applications have made such changes to date. Thus, for an application, the advantage provided by SMP architecture is lost in such situations. Therefore, it would be advantageous to have an improved method and apparatus for taking advantage of the SMP architecture within the graphics pipeline used by the application.

SUMMARY OF THE INVENTION

The present invention provides a method and apparatus for processing hierarchical graphics data supplied by an application. The data processing system includes a plurality of threads in which a first thread receives and stores graphics data from the application. The application then performs a procedure call to initiate an update for an attached display device. The hierarchical data is then traversed. During traversal, the data is partitioned into workgroups and a sequence number is associated with each workgroup identifying the order in which the workgroup is processed. Each thread processes workgroups according to which sequence numbers it obtains uniquely from a location accessible to all threads. Processed workgroups are stored in a memory associated with the thread processing that workgroup. The primary thread dispatches the processed workgroups from each of the memories associated with the threads to a graphics processor for the graphics display device. The workgroups are dispatched in an order indicated by the sequence number associated with each processed workgroup.

The above as well as additional objectives, features, and advantages of the present invention will become apparent in the following detailed written description.

DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
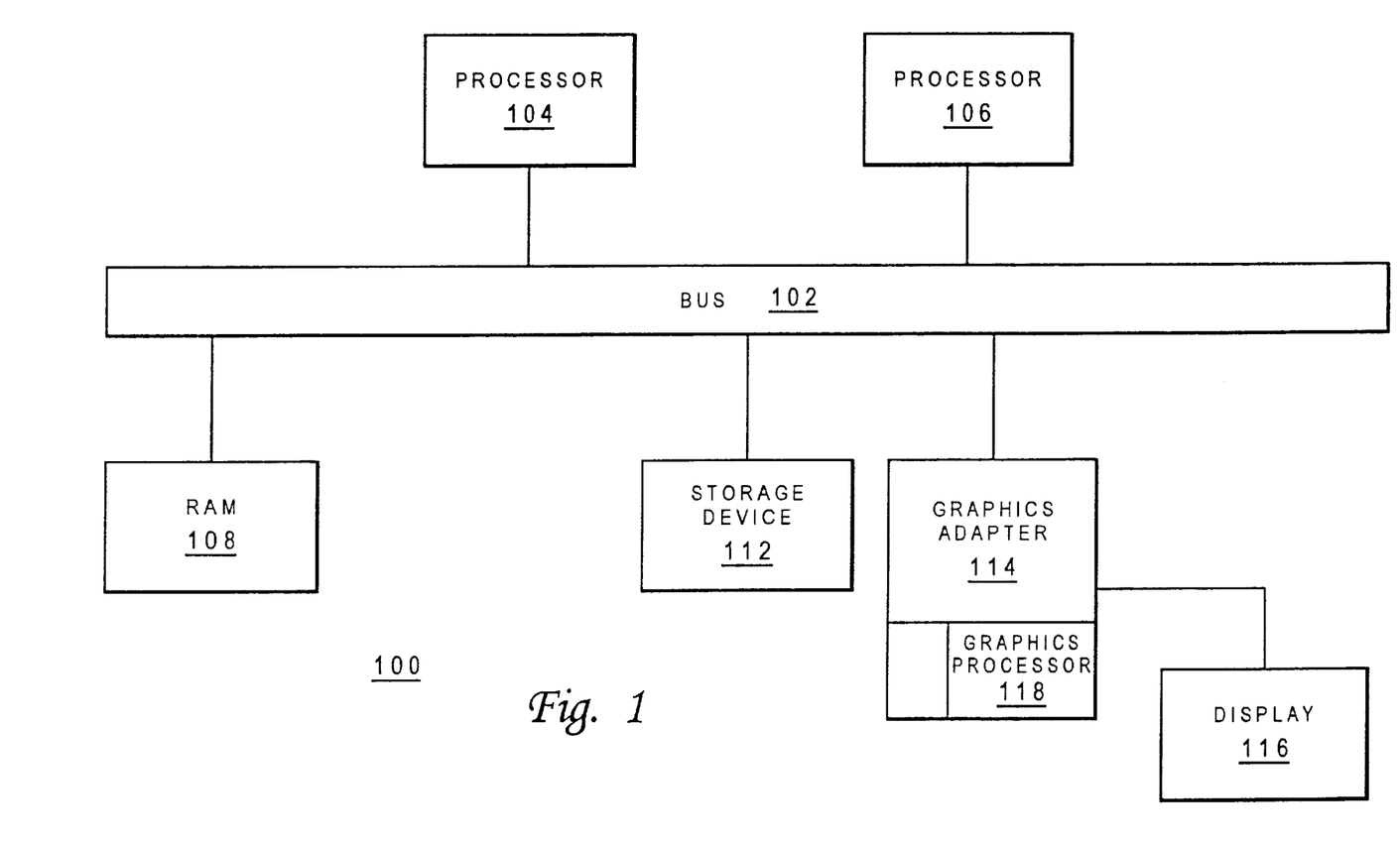
FIG. 1 is a block diagram of selected components in a data processing system depicted in accordance with a preferred embodiment of the present invention.

With reference now to the figures, and in particular with reference to FIG. 1, a block diagram of selected components in a data processing system is depicted in which a preferred embodiment of the present invention may be implemented. Data processing system 100 includes a bus 102 with processors 104 and 106 connected to it. Data processing system 100 is an example of a SMP architecture in accordance with a preferred embodiment of the present invention. Although the depicted example illustrates only two processors, other numbers of processors may be implemented in accordance with a preferred embodiment of the present invention. Bus 102 may be implemented in a number of ways. For example, bus 102 may be implemented using a periphial component interconnect (PCI) local bus. Additionally, memory in the form of random access memory (RAM) 108 and storage device 112 also are connected to bus 102. Storage device 112 may take various forms, such as a floppy disk drive, hard disk drive, or a storage subsystem containing a number of different storage devices. Additionally, a graphics adapter is connected to bus 102, which provides an interface for video display 116. Graphics adapter 104 includes rasterization hardware 118. Processors 104 and 106 may be implemented using a number of available microprocessors, such as a Pentium processor available from Intel Corporation or a 604 or 601 Power PC processor available from International Business Machines Corporation. Instructions for performing the processes of the present invention are executed by processors 104 and 106 and are stored in RAM 108, and/or storage device 112.

Figure 2A:
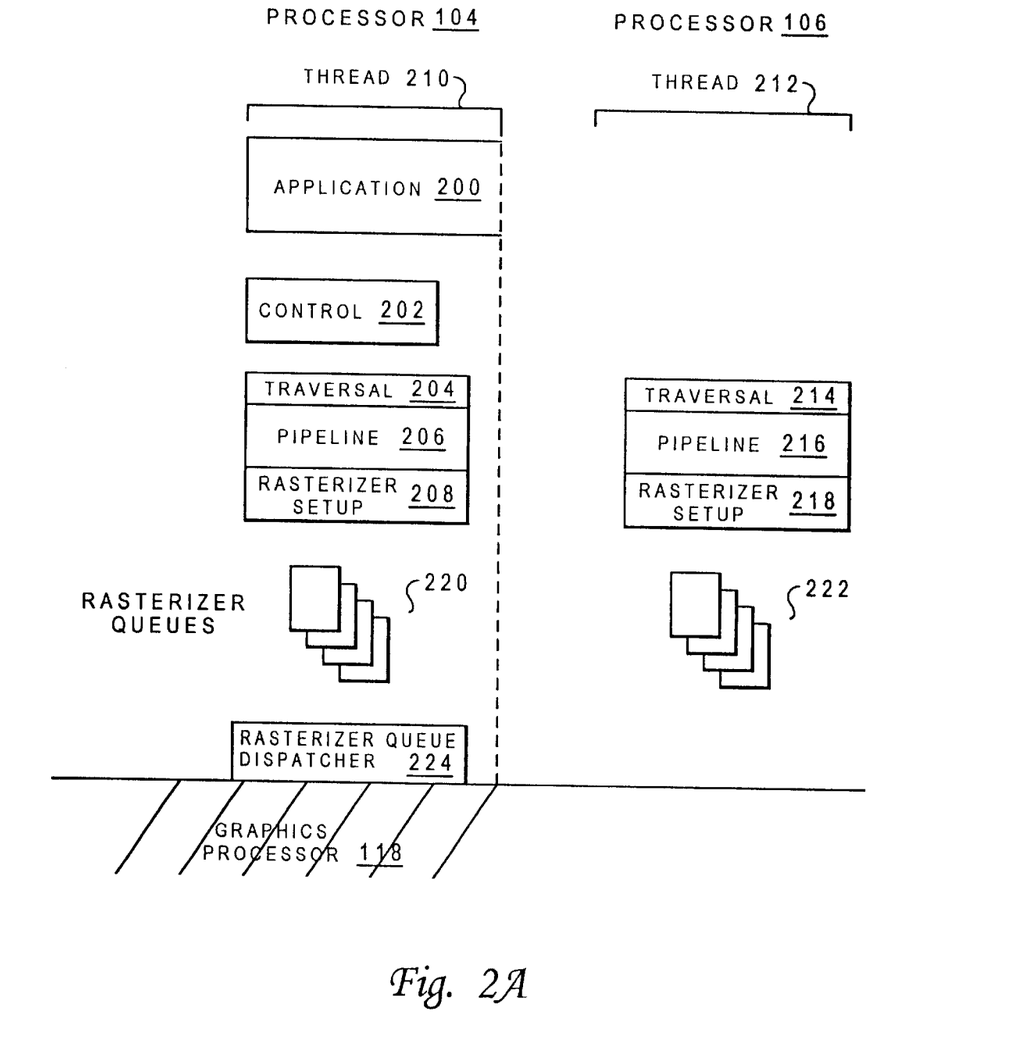
FIG. 2A is a block diagram of software components and their relation to data processing system 100 depicted in accordance with a preferred embodiment of the present invention.

With reference next to FIG. 2A, a block diagram of software components and their relation to data processing system 100 is depicted in accordance with a preferred embodiment of the present invention. Application 200 is a program that includes a number of functions, including the display of data on display 116 in data processing system 100. Application 200 may be, for example, a CAD, CAM, or CAE application. The execution of control block 202, traversal block 204, pipeline 206, and rasterizer setup block 208 are executed in a thread 210 by processor 104. A second thread 212 is used to provide for parallel processing in which traversal block 214, pipeline block 216, and rasterizer setup block 218 form second thread 212, which is executed by processor 106. In the depicted example, application 200 is configured only to take advantage of graphics processing by processor 104 through thread 210 rather than processing by both processors 104 and 106. In the depicted example, application 200 is not configured to take advantage of the SMP structure and data processing system 100. Application 200 sends data and commands to control block 202. In particular, the data is in the form of hierarchical graphics data, which is graphics data provided by application in a hierarchical organization where the root of a tree of work elements is associated with a view.

Rasterizer queues 220 are set up and filled in by thread 210 while rasterizer queues 222 are set up and filled in by thread 212. Rasterizer queue dispatcher 224 is executed by processor 104 as part of thread 210. Rasterizer queues 220 and 222 are found in a memory, such as RAM 108 and are employed to store processed graphics data for displaying. Data from these rasterization queues are sent to graphics processor 118 for display on display 116 by rasterizer queue dispatcher 224.

Traversal blocks 204 and 214 are employed to traverse various structures to determine what attributes will be executed by a particular thread in accordance with a preferred embodiment of the present invention.

Pipelines 206 and 216 perform various graphics intensive functions, typically associated with pipeline processing in which various functions such as transformations, culling, tessellation, clipping, lighting, and depth cueing are performed.

In sending graphics data and commands for display, control block 202 receives primitives from application 200. A "primitive" defines the shape of various components of an object, such as lines, points, polygons in two or three dimensions, text, polyhedra, or freeform surfaces in three dimensions. A primitive may also define attributes, such as linestyle, color, or surface texture. Also, a primitive may include data defining the conductivity relationships and positioning information that describe how the component of an object fit together. Control block 202 creates work elements (WE) which may be for example, (1) a drawing primitive, which is a command to draw, i.e. a line, a polygon, a triangle, or text; (2) an attribute primitive, which is a command to change an attribute, also called an attribute change, i.e. color or linestyle, or (3) a context primitive, which is context information for an area of display or a window. During traversal, traversal block 204 groups WEs into multiple segments in accordance with a preferred embodiment of the present invention. Each segment also is called a workgroup (WG), and each WG may contain one or more WEs. The number of WEs in a WG may be determined by various factors such as the estimated amount of processing time for a WG. Rasterizer set up blocks 208 and 218 are employed to manage and store process workgroups in rasterizer queues 220 and 222.

Figure 2B:
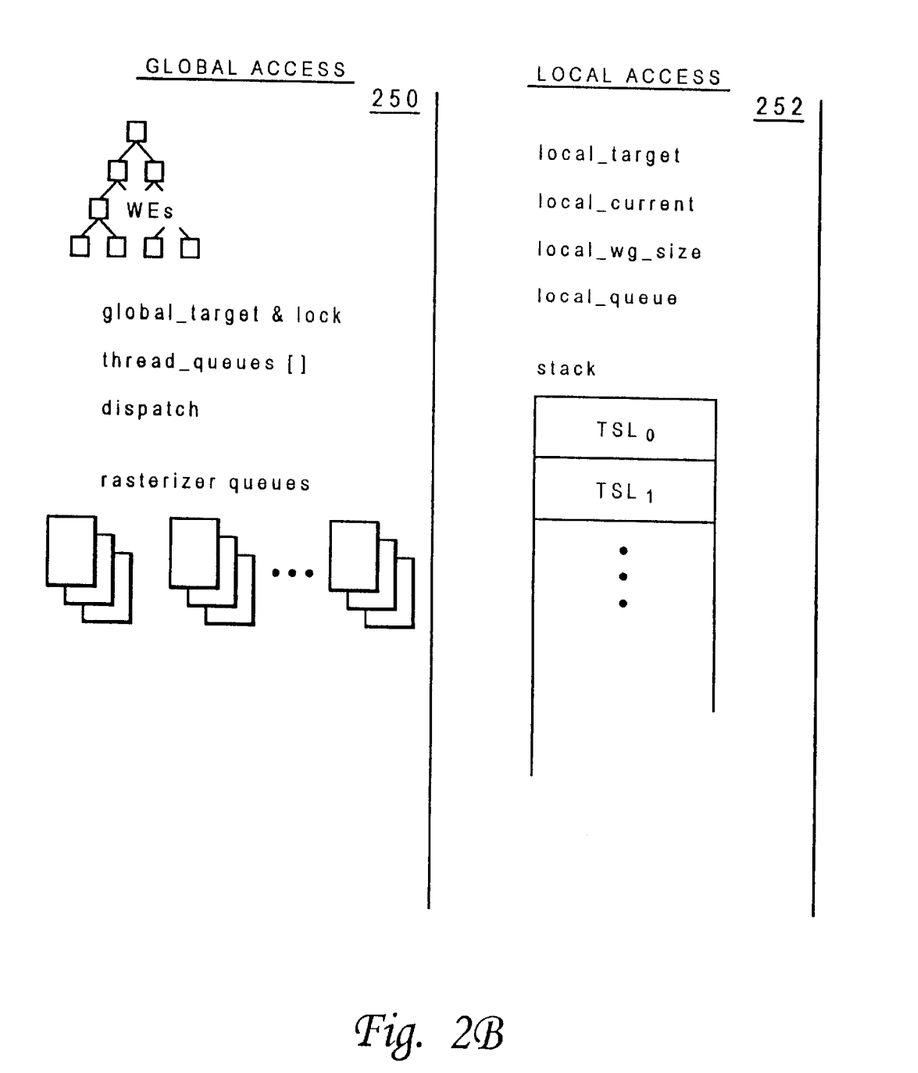
FIG. 2B is a diagram illustrating data and variables in accordance with a preferred embodiment of the present invention.

Turning to FIG. 2B, a diagram of data and variables are illustrated in accordance with a preferred embodiment of the present invention. Global access 250 contains variables and data structures that are accessed by all threads in the present invention. In particular, work elements and rasterizer queues are accessed by all threads. Additionally, variables such as global_target, lock, queues[thread], and dispatch are variables that may be accessed by any thread as global variables. Local access section 252 shows variables that are used by each of the threads as local variables. In particular, a stack including a traversal state list (TSL) used to store attributes is employed by each thread as a local data structure in accordance with a preferred embodiment of the present invention. Other variables such as local_target, local_current, local_WG_size, and local queue are employed also as local variables in accordance with a preferred embodiment of the present invention.

Figure 3:
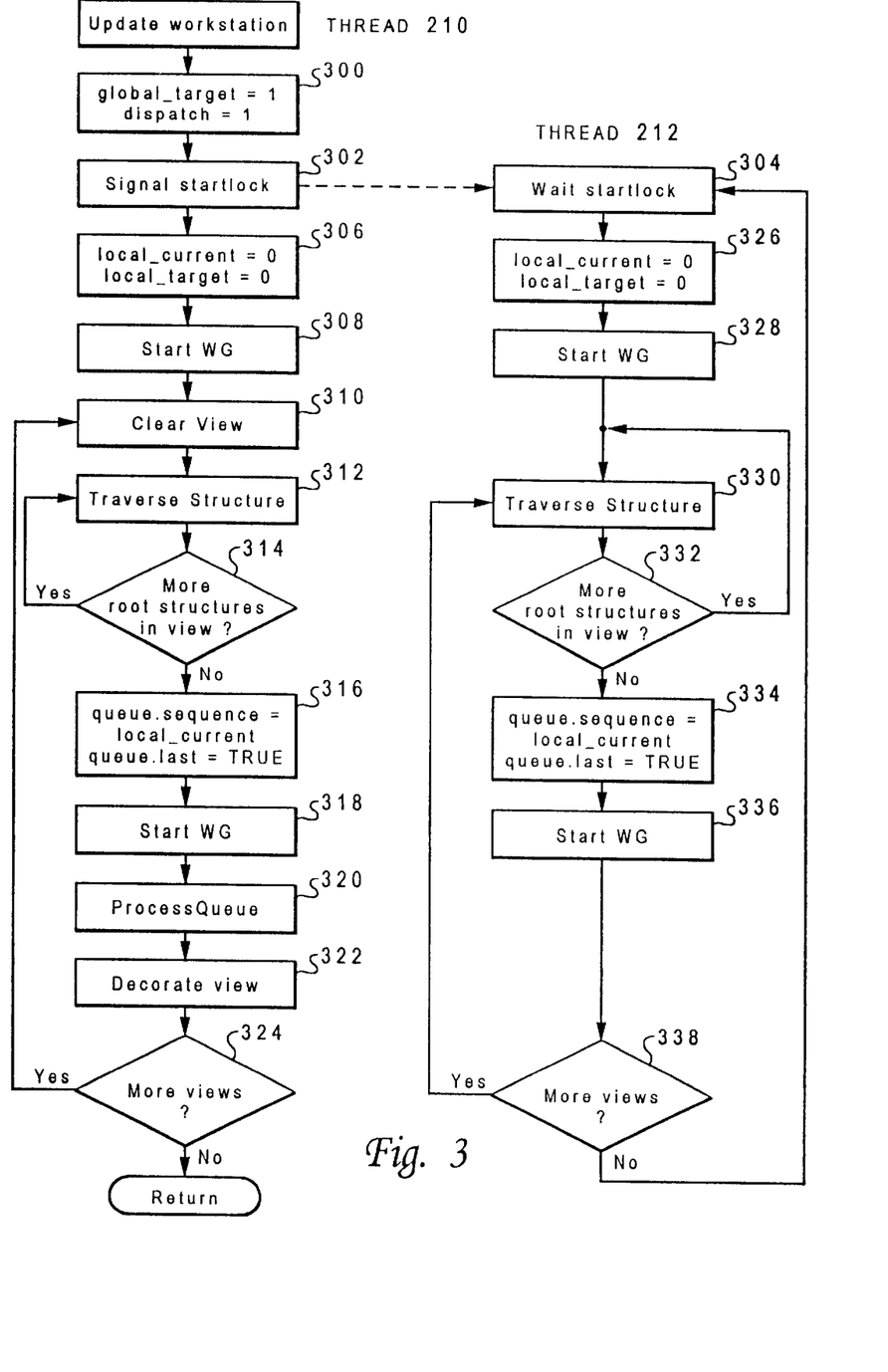
FIG. 3 is a flowchart showing the procedure followed by threads 210 and 212 in accordance with a preferred embodiment of the present invention.

With reference now to FIG. 3, a flowchart showing the procedure followed by threads 210 and 212 in accordance with a preferred embodiment of the present invention. The procedure begins by initializing variables global_target and dispatch by setting them equal to one (step 300). Thereafter, the procedure signals start_lock (step 302), which is employed to initiate a parallel thread 212, which waits for start_lock to be signalled to begin processing (step 304). Referring back to the procedure in thread 210, the variables local_current and local_target are set equal to zero. The variable local_current is employed to indicate which WG is presently being processed while local_target is a variable used to determine whether the particular thread is processing the WG (step 306). Thereafter, the StartWG procedure is performed (step 308), which is described in more detail in FIG. 4 below. The StartWG procedure is employed to set up queues and marking which thread is to process a particular WG.

Next, the procedure clears the view (step 310). Clearing the view involves clearing a portion of the frame buffer to set up the view for drawing. Then a TraverseStructure procedure is performed (step 312), which is described in more detail in FIG. 6 below.

Thereafter, a determination is made as to whether additional root structures are present in the view (step 314). If additional root structures are in the view, the procedure returns to step 312 to traverse these structures. Otherwise, the variables queue.sequence is set equal to local_current and the variable queue.last is set equal to TRUE (step 316). These variables are used to indicate that a view has been completed. Thereafter, StartWG is performed (step 318). Next, the procedure performs ProcessQueue (step 320), which is described in more detail in FIG. 7 below.

Thereafter, DecorateView is performed (step 322). This step involves drawing a border around the view. The procedure then determines whether additional views are present for processing (step 324). If additional views are present for processing, the procedure returns to step 310. Otherwise, the procedure returns to the application. Steps 326, 328, 330, 332, 334, 336, and 338 correspond to steps 306, 328, 312, 314, 316, 318, and 324, respectively. Unlike the steps for thread 210, these steps do not interface directly with the program, but perform processing in parallel with thread 210 to provide more processing power for graphics data according to the present invention.

Figure 4:
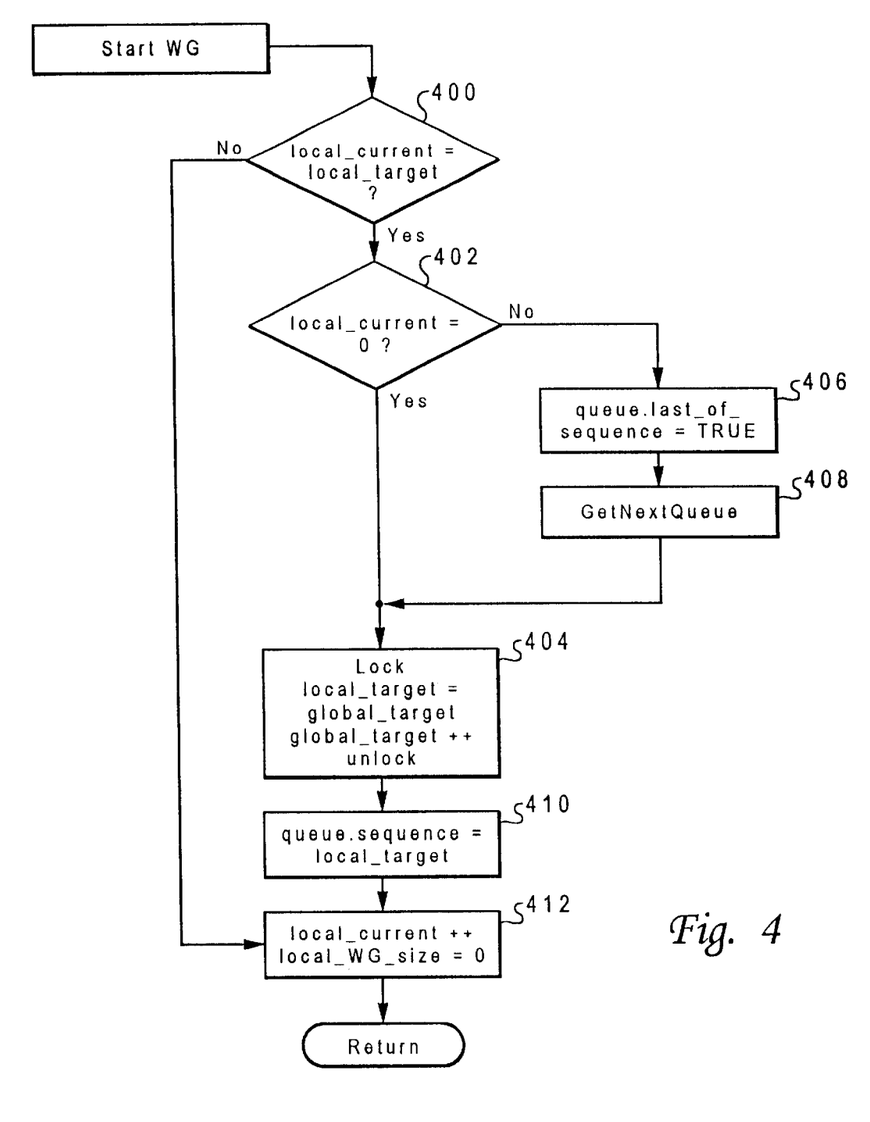
FIG. 4 is a flowchart of a StartWG procedure depicted in accordance with a preferred embodiment of the present invention.

With reference now to FIG. 4, a flowchart of a procedure StartWG is depicted in accordance with a preferred embodiment of the present invention. The procedure begins by determining whether the variable local_current is equal to local_target (step 400). This step is employed to determine whether the processing of a WG has finished. If the values of the two variables are equal, the procedure then determines whether the variable local_current is equal to zero (step 402). If this variable is equal to zero, the procedure then locks the variable global_target to prevent concurrent access, sets the variable local_target equal to global_target and increments the variable global_target by one and then unlocks the variable (step 404). The variable global_target is a global variable that all threads compete for access in determining whether a primitive is to be uniquely processed by a thread. With reference again to step 402, if variable local_current is not equal to zero, the procedure then sets queue.last_of_sequence equal to TRUE (step 406) and then proceeds to GetNextQueue (step 408), which is described in more detail in FIG. 5 below.

The procedure then proceeds to step 404 as discussed before. Thereafter, queue.sequence is set equal to local_target (step 410). Then, the procedure increments the variable local_current and sets local_WG_size equal to zero (step 412) with the procedure returning to the calling procedure thereafter. The variables set in step 412 are used in the TraverseStructure procedure described in FIG. 6 with variable local_WG_size being used in the determination of the sizes of WGs.

Figure 5:
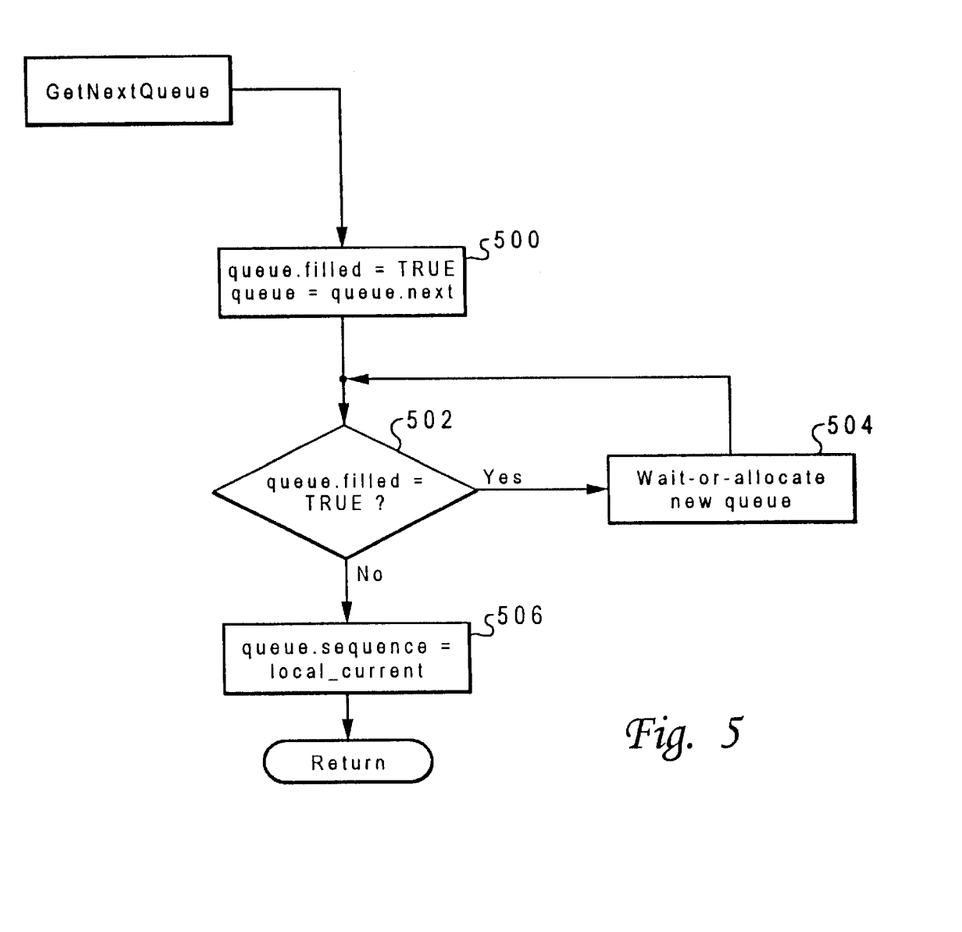
FIG. 5 is a flowchart of a GetNextQueue procedure depicted in accordance with a preferred embodiment of the present invention.

With reference now to FIG. 5, a flowchart of a GetNextQueue procedure is depicted in accordance with a preferred embodiment of the present invention. The procedure begins by setting queue.filled equal to TRUE and queue equal to queue.next (step 500). By setting queue.filled equal to TRUE, that queue is marked as being filled. Setting queue equal to queue.next obtains the next queue for processing. Thereafter, the procedure determines whether the variable queue.filled is equal to TRUE (step 502). If the answer to this determination is "yes", the procedure then waits for an empty queue to become available or allocates a new queue by inserting the new queue into the list before the filled queue (step 504). Thereafter, the procedure returns to step 502. If the variable queue.filled is not equal to TRUE, the procedure then sets the variable queue.sequence equal to the variable local_current (step 506) with the procedure returning to the calling procedure thereafter.

Figure 6:
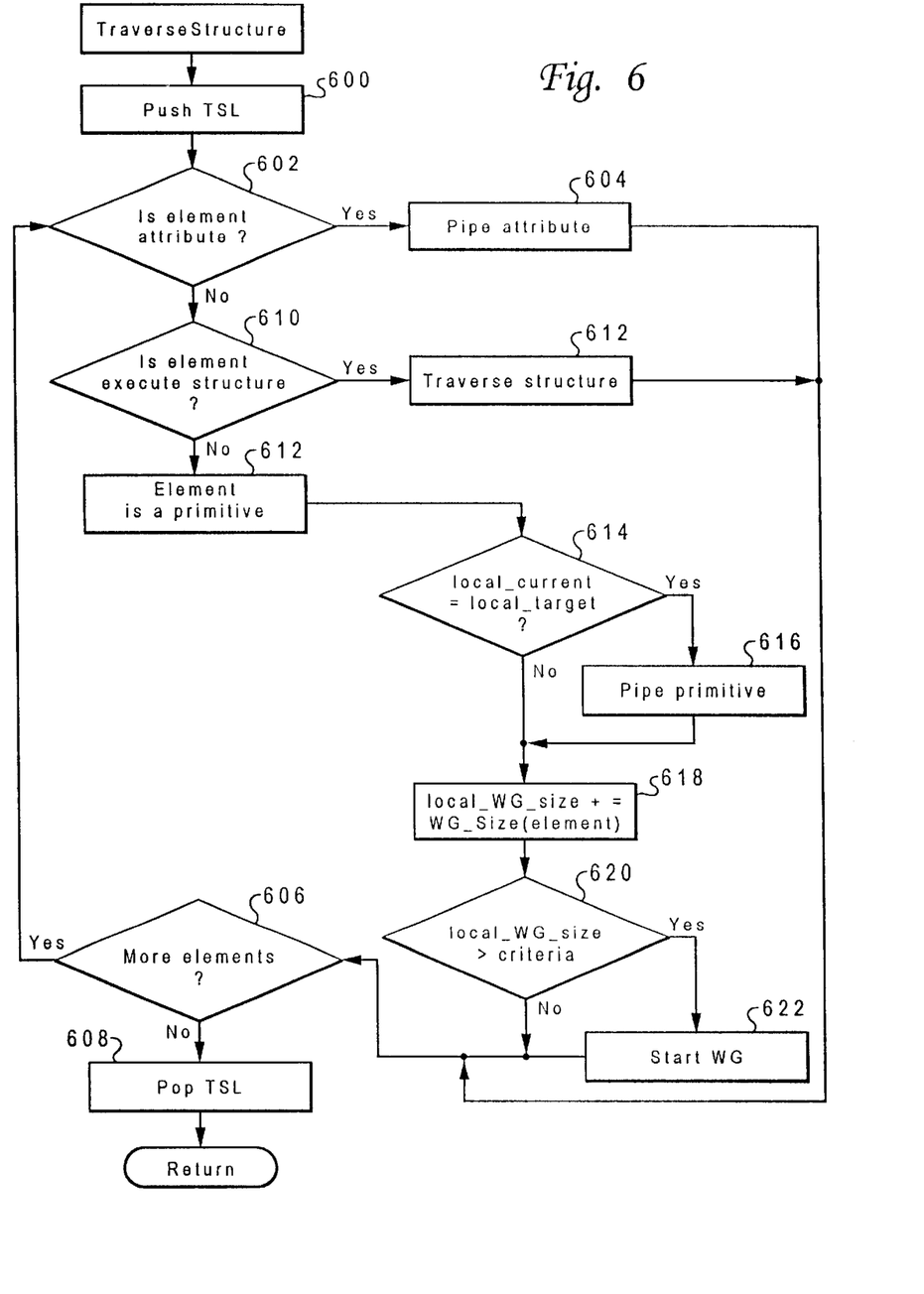
FIG. 6, a flowchart of a TraverseStructure procedure is depicted in accordance with a preferred embodiment of the present invention.

With reference now to FIG. 6, a flowchart of a TraverseStructure procedure is depicted in accordance with a preferred embodiment of the present invention. The procedure begins by pushing the traversal state list (TSL) onto the stack (step 600). The procedure then determines whether the element is an attribute (step 602). If the procedure is an attribute, the procedure then performs pipeline attribute processing (step 604). This step results in the TSL being modified as needed to set attributes. Thereafter, the procedure proceeds to determine whether more elements are present for processing (step 606). If no additional elements are present for processing, the procedure then pops the TSL (step 608) with the procedure returning to the calling procedure thereafter. With reference again to step 606, if more elements are present for processing, the procedure returns to step 602. If the element is not an attribute, a determination is then made as to whether the element is an execute structure (step 610). If the element is an execute structure, the procedure then executes the TraverseStructure procedure recursively (step 612). Basically, the procedure begins again with another push. This is a recursive procedure in accordance with a preferred embodiment of the present invention. Thereafter, the procedure then proceeds to step 606 as previously described. With reference again to step 610, if the element is not an execute structure element, the procedure then determines that the element is a primitive (step 612). The procedure then determines whether the variable local_current is equal to the variable local_target (step 614). The variable local_target is a local variable which is the sequence number of the workgroup a particular thread is to process. If the variables are equal, the graphics pipeline primitive processing is performed (step 616). Thereafter, the procedure increments the variable local_WG_size by WG_size(element) (step 618). The procedure also proceeds directly to step 618 from step 614 if the variables local_current and local_target are not equal to each other. Step 618 is employed to calculate the current amount of work from the current workgroup that has been processed by this thread. From step 618, the procedure then determines whether the variable local_WG_size has met the WG_size criteria (step 620). If the variable has met the criteria, the procedure then proceeds to execute the StartWG procedure (step 622). Thereafter, the procedure proceeds to step 606 as described above. When all elements have been processed, the procedure pops the TSL (step 608) and returns to the calling procedure.

Figure 7:
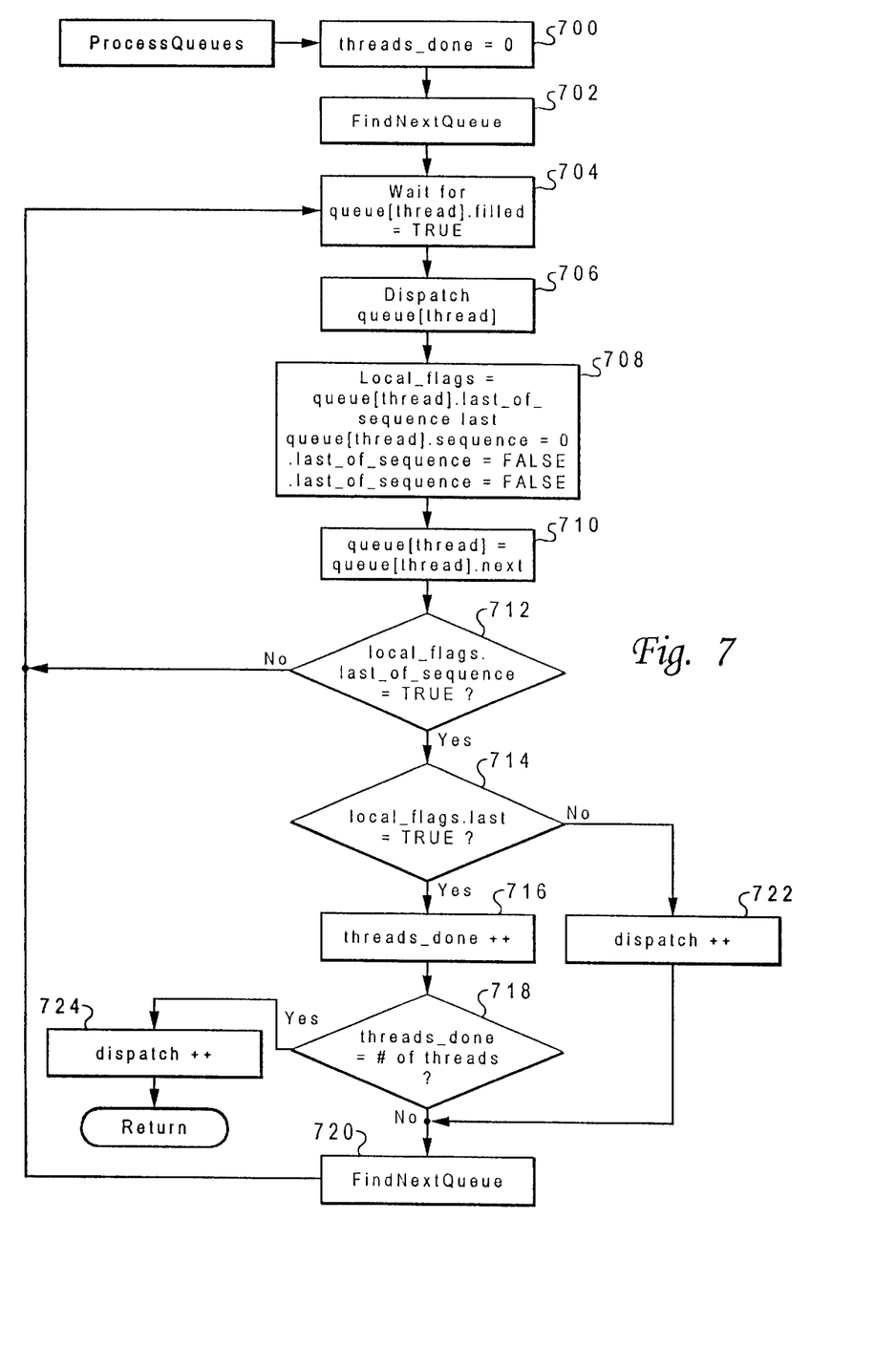
FIG. 7, a flowchart of a ProcessQueues procedure is depicted in accordance with a preferred embodiment of the present invention.

With reference now to FIG. 7, a flowchart of a ProcessQueues procedure is depicted in accordance with a preferred embodiment of the present invention. The procedure begins by setting the variable threads_done equal to zero. Next, the procedure executes FindNextQueue (step 702), which is described in more detail in FIG. 8 below. The FindNextQueue procedure finds the next queue that should be dispatched for processing.

The procedure then waits for queue[thread].filled to become equal to TRUE (step 704). The procedure then dispatches queue[thread] (step 706) and then sets local_flags.last_of_sequence and local_flags.last are set to queue[thread].last_of_sequence and queue[thread].last, respectively. queue[thread] is a list of queues for each thread in the process. Still with reference to step 708, the variables sequence, last_of_sequence, and last associated with queue[thread] are set equal to zero, FALSE, and FALSE respectively. Next, the procedure sets queue[thread] equal to queue[thread].next (step 710). Then a determination is made as to whether local_flags.last_of_sequence is equal to TRUE (step 712). If the variable is not equal to TRUE, the procedure then returns to step 704 as described above. Basically, the procedure returns to process the next queue for the same thread. This determination is made to see whether this is the last queue in which data for the WG is found. If the variable is equal to TRUE, the procedure then determines whether the variable local_flags.last is equal to TRUE (step 714). Basically, this step determines whether the end of the view has occurred. If the variable is equal to TRUE (the view has finished), the procedure then increments the variable threads_done by one (step 716). This variable counts the number of threads that have been finished in processing queues for WGs which are contained within the current view. Next, a determination is made as to whether the variable threads_done is equal to the number of threads (step 718). If the number of threads_done is not equal to the number of threads, the FindNextQueue procedure is performed (step 720) with the procedure then returning to step 704. With reference again to step 714, if the variable local_flags.last is not equal to TRUE, the procedure then increments the dispatch variable by one (step 722) with the procedure then proceeding to step 720. With reference again to step 718, if the variable threads_done is equal to the number of threads, indicating that the processing of queues for all the threads is finished, the procedure then increments the variable dispatch by one (step 724) and returns to the calling procedure thereafter.

Figure 8:
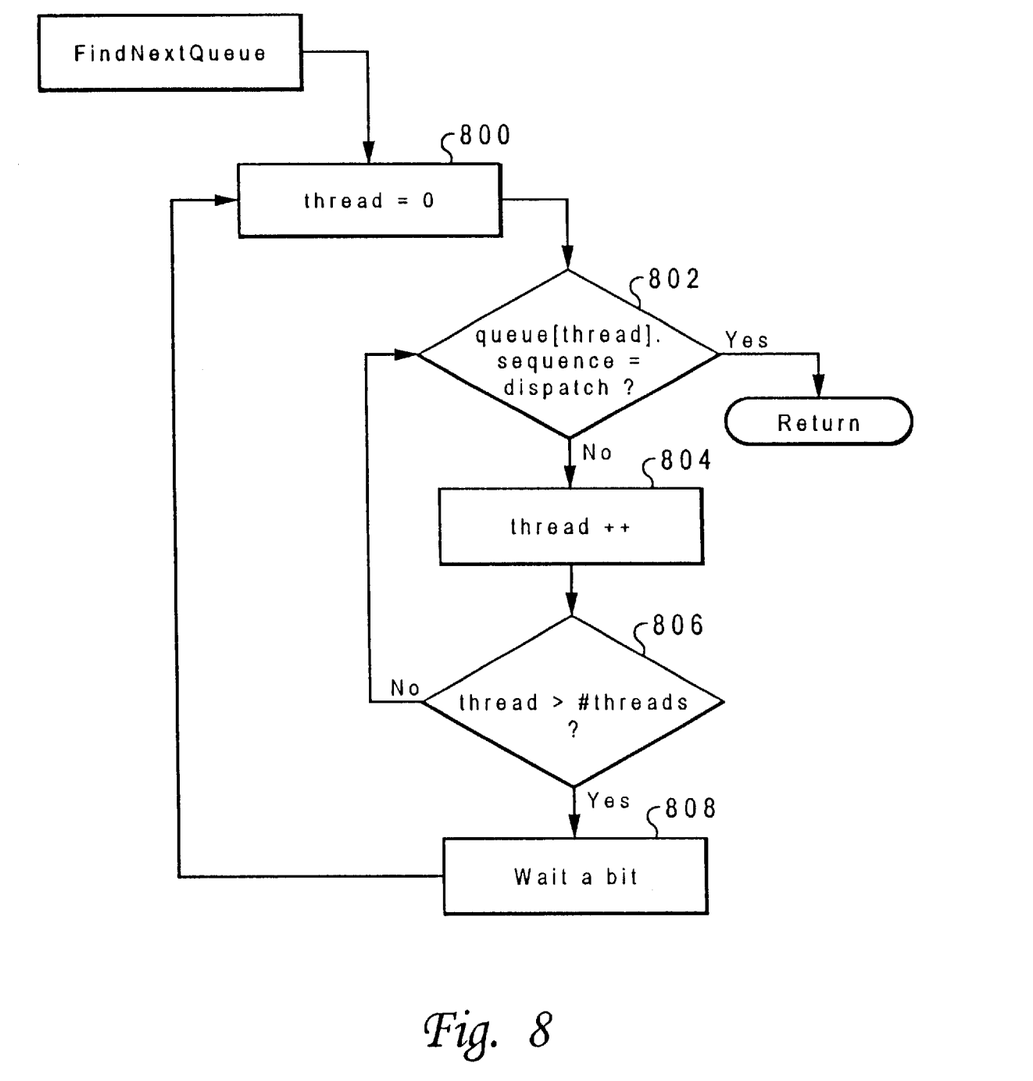
FIG. 8, a flowchart of a FindNextQueue procedure is depicted in accordance with a preferred embodiment of the present invention.

With reference now to FIG. 8, a flowchart of a FindNextQueue procedure is depicted in accordance with a preferred embodiment of the present invention. The procedure begins by setting the variable thread equal to zero (step 800). Thereafter, a determination is made as to whether queue [thread].sequence is equal to dispatch (step 802). If the variable is equal to dispatch, the procedure returns to the calling procedure. Otherwise, the procedure increments the thread variable by one (step 804). Next, the procedure determines whether thread is greater than the number of threads present (step 806). If the variable thread is not greater than the number of threads, the procedure returns to step 802 as described above. Otherwise, the procedure waits for a selected amount of time (step 808) and then returns to step 800. In step 802, the determination basically determines which thread has queues with sequence numbers matching the sequence number to be dispatched next.

It is important to note that while the present invention has been described in the context of a fully functional data processing system, those skilled in the art will appreciate that the mechanisms of the present invention are capable of being distributed in the form of a computer readable medium of instructions in a variety of forms, and that the present invention applies equally regardless of the type of signal bearing medium actually used to carry out the distribution. Examples of computer readable medium include: recordable type medium such as floppy disks and CD-ROMs and transmission type medium such as digital and analog communication links.

The description of the preferred embodiment of the present invention has been presented for purposes of illustration and description, but is not intended to be exhaustive or limit the invention in the form disclosed. For example, although the depicted example only illustrates the use of two threads, any number of threads may be employed in accordance with a preferred embodiment of the present invention. Many modifications and variations will be apparent to those of ordinary skill in the art. The embodiment was chosen and described in order to best explain the principles of the invention and the practical application to enable others of ordinary skill in the art to understand the invention for various embodiments with various modifications as are suited to the particular use contemplated.

What is claimed is:

1. A method in a data processing system for processing hierarchical graphics data from an application designed to send data to a single thread, said data processing system having a plurality of threads, and a graphics display device, the method comprising:

receiving the graphics data from the application at a primary thread within the plurality of threads;

partitioning the graphics data into a plurality of workgroups and associating a sequence number with each workgroup, within the plurality of workgroups each of said plurality of workgroups including a plurality of graphics primitives grouped together based upon an estimated amount of processing required for each workgroup;

assigning each of the plurality of threads a portion of the plurality of workgroups;

in response to receiving the portion of the plurality of workgroups at a thread, processing the portion to produce a processed portion, wherein the processed portion includes processed workgroups;

storing the processed workgroups in a memory associated with the thread; and sending the processed workgroups from each memory to the graphics display device in an order indicated by sequence numbers associated with processed workgroups, wherein modification to the application is unnecessary.

2. The method of claim 1, wherein each of the plurality of threads is executed on a processor in the data processing system.

3. The method of claim 1, wherein the data processing system includes two microprocessors, the plurality of threads includes a first thread and a second thread, wherein the first thread and the application execute within the first processor and the second thread executes within the second processor.

4. A data processing system comprising:

a primary thread including:

receiving means for receiving a graphics data stream from an application;

partitioning means for partitioning the graphics data into a plurality of workgroups, wherein each workgroup is associated with a sequential identifier, each of said plurality of workgroups including a plurality of graphics primitives grouped together based upon an estimated amount of processing required for each workgroup;

assigning means for assigning each workgroup in a plurality of workgroups to a thread;

processing means for processing each workgroup assigned to the processing thread;

an associated memory storing the processed workgroup prior to dispatched to the graphics display device;

dispatch means for dispatching processed workgroups to the graphics display device from each memory associated with a thread in a sequence indicated by the sequential identifier; and a secondary thread including:

processing means for processing each workgroup assigned to the secondary thread;

partitioning means for partitioning the graphics data into a plurality of workgroups, wherein each workgroup is associated with a sequential identifier;

assigning means for assigning each workgroup in a plurality of workgroups to a thread; and an associated memory for storing processed workgroup prior to dispatch to the graphics display device, wherein processed workgroups are dispatched by the dispatch means in the primary thread.

5. The data processing system of claim 4, wherein the data processing system includes a first processor and a second processor.

6. The data processing system of claim 5, wherein the primary thread and the application are executed within the first processor and the secondary thread is executed within the second processor.

7. The data processing system of claim 4, further including a number of additional secondary threads, each including processing means for processing each workgroup assigned to the additional secondary threads.

8. The data processing system of claim 5, wherein the first processor and the second processor are 604 PowerPC processors.

9. The data processing system of claim 5, wherein the first processor and the second processor are 601 PowerPC processors.

10. The data processing system of claim 4, wherein the data processing system is a symmetric multiprocessor data processing system.

11. A computer readable medium of instructions for processing graphics data from an application, the computer readable medium comprising:

first instructions for receiving graphics data from the application at a primary thread within the plurality of threads;

second instructions for partitioning the data stream into a plurality of workgroups and associating a sequence number with each workgroup within the plurality of workgroups, each of said plurality of workgroups including a plurality of graphics primitives grouped together based upon an estimated amount of processing required for each workgroup;

third instructions for assigning each of the plurality of threads a portion of the plurality of workgroups;

fourth instructions, responsive to receiving the portion of the plurality of workgroups at a thread, for processing the portion to produce a processed portion, wherein the processed portion includes processed workgroups;

fifth instructions for storing the processed workgroups in a memory associated with the threads; and sixth instructions for sending the processed workgroups from each memory to a graphics display device in an order indicated by sequence numbers associated with processed workgroups.

12. The computer readable medium of claim 11, wherein the computer readable medium is a floppy disk drive.

13. The computer readable medium of claim 11, wherein the computer readable medium is a hard disk drive.

14. The computer readable medium of claim 11, wherein the computer readable medium is a CD-ROM.

* * * * *

UNITED STATES PATENT AND TRADEMARK OFFICE
CERTIFICATE OF CORRECTION

PATENT NO. : 6,343,309 B1
DATED : January 29, 2002
INVENTOR(S) : Clarke et al.

It is certified that error appears in the above-identified patent and that said Letters Patent is hereby corrected as shown below:

Column 9,
Line 6, please add -- e -- after "604".

Signed and Sealed this

Eleventh Day of June, 2002

Attest:

JAMES E. ROGAN
Attesting Officer  Director of the United States Patent and Trademark Office